US012561425B2

(12) United States Patent
Patel et al.

(10) Patent No.: US 12,561,425 B2
(45) Date of Patent: Feb. 24, 2026

(54) TECHNOLOGY FOR USING A SIMULATED STATE OF A DIGITAL TWIN AS A PASSWORD

(71) Applicant: INTERNATIONAL BUSINESS MACHINES CORPORATION, Armonk, NY (US)

(72) Inventors: Devang Dineshchandra Patel, Dublin, CA (US); Sagar Krupa Satya Kunavarapu, Bengaluru (IN); Apparsamy Perumal, Bangalore (IN); Jian Wu, Mansfield, TX (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 17/657,149

(22) Filed: Mar. 30, 2022

(65) Prior Publication Data

US 2023/0315834 A1     Oct. 5, 2023

(51) Int. Cl.
*G06F 21/46*         (2013.01)
*G06F 21/31*         (2013.01)
(52) U.S. Cl.
CPC .............. *G06F 21/46* (2013.01); *G06F 21/31* (2013.01)
(58) Field of Classification Search
CPC ..... H04L 63/083; H04L 9/0863; G06F 21/31; G06F 21/46; H04W 12/06
USPC ................................................ 726/2, 18, 21
See application file for complete search history.

(56) References Cited

U.S. PATENT DOCUMENTS

| | | | |
|---|---|---|---|
| 9,450,954 B2 * | 9/2016 | Sharif | ..................... G06F 21/31 |
| 9,882,717 B2 | 1/2018 | Camenisch | |
| 10,333,913 B2 | 6/2019 | Kline | |
| 10,558,790 B2 | 2/2020 | Kline | |
| 11,431,492 B2 * | 8/2022 | Soryal | ................... H04L 9/0891 |
| 11,750,601 B1 * | 9/2023 | Yager | .................... H04L 67/535 |

(Continued)

FOREIGN PATENT DOCUMENTS

| | | | |
|---|---|---|---|
| EP | 3382616 A1 | 10/2018 | |
| EP | 4080846 A1 * | 10/2022 | ........... H04L 63/062 |

OTHER PUBLICATIONS

V. Damjanovic-Behrendt, A digital twin-based privacy enhancement mechanism for the automotive industry, 2018 International Conference on Intelligent Systems (IS) (2018), pp. 272-279.*

(Continued)

*Primary Examiner* — Lizbeth Torres-Diaz
(74) *Attorney, Agent, or Firm* — Kimberly Zillig

(57) ABSTRACT

Authenticating access to a system through the following operations: (i) determining at least one digital twin corresponding to a user; (ii) setting, by the user, modifications to at least one digital twin; (iii) generating, by the digital twin, a value based on the modifications; (iv) authenticating the user based on the generated value matching a stored value; and (v) based on the authentication, granting access to the system. A digital twin of a complex entity can have innumerable states based on the input values. In some embodiments, a new password can make an effect on a selected digital twin with one input or a sequence of inputs. The resulting state is transformed using a hashing algorithm to generate the final password, which is known only to the service provider, can act as a password.

17 Claims, 4 Drawing Sheets

250

(56) References Cited

U.S. PATENT DOCUMENTS

| | | | | |
|---|---|---|---|---|
| 12,086,220 | B1 * | 9/2024 | Miles | G06F 21/31 |
| 2010/0005128 | A1 | 1/2010 | Ergun | |
| 2014/0152547 | A1 | 6/2014 | Boss | |
| 2017/0223008 | A1 * | 8/2017 | Camenisch | H04L 9/085 |
| 2018/0332013 | A1 * | 11/2018 | Kline | H04L 63/06 |
| 2019/0005195 | A1 * | 1/2019 | Peterson | G16H 10/60 |
| 2019/0087830 | A1 | 3/2019 | Mercury | |
| 2019/0108328 | A1 * | 4/2019 | Abidin | G06F 21/602 |
| 2020/0118053 | A1 * | 4/2020 | Chapin | G06Q 10/06315 |
| 2021/0109837 | A1 * | 4/2021 | Rakshit | G06F 11/3476 |
| 2021/0157312 | A1 * | 5/2021 | Cella | G01M 13/045 |
| 2021/0208576 | A1 * | 7/2021 | Muenzel | G05B 19/41885 |
| 2021/0374032 | A1 * | 12/2021 | Rakshit | G06F 11/3093 |
| 2022/0114283 | A1 * | 4/2022 | Park | H04L 63/101 |
| 2022/0165438 | A1 * | 5/2022 | Marzorati | G05B 13/04 |
| 2022/0191648 | A1 * | 6/2022 | Smith | G06F 11/3089 |
| 2022/0198390 | A1 * | 6/2022 | DeLuca | G06F 40/20 |
| 2022/0366102 | A1 * | 11/2022 | Chang | B29C 45/766 |
| 2023/0161934 | A1 * | 5/2023 | Ganesan | G06N 5/022 |
| | | | | 703/13 |
| 2024/0273380 | A1 * | 8/2024 | Guan | G06N 3/08 |

OTHER PUBLICATIONS

Ahmadzadegan, et al., "A Method for Securing Username and Password Against the Keylogger Software Using the Logistic Map Chaos Function", 2015 2nd International Conference on Knowledge-Based Engineering and Innovation (KBEI), Nov. 5-6, 2015, Iran University of Science and Technology, 3 pgs.

Mahmood, A., "Design Random Number Generator Utilizing the Futoshiki Puzzle", Journal of Information Hiding and Multimedia Signal Processing, vol. 10, No. 1, Jan. 2019, Ubiquitous International, 10 pgs.

Mahmood, A., "Genetic Algorithms as a Random Passwords Generator," Journal of Al-Turath University College, 12, 15 pgs., 2012, <https://www.iasj.net/iasj/download/78618dc6223e714faf>.

Mahmood, et al., "Implementation of the Binary Random Number Generator Using the Knight Tour Problem", Modem Applied Science, vol. 10, No. 4, Jan. 13, 2016, Published by Canadian Center of Science and Education, 13 pgs.

Tada, et al., "Qualities of the Chaotic Signal Generator for One-Time Password System," 2004 International Symposium on Nonlinear Theory and its Applications (NOLTA2004), Nov. 29-Dec. 3, 2004, Fukuoka, Japan, 4 pgs.

Voris, et al., "Accelerometers and Randomness: Perfect Together", In Proceedings of the fourth ACM conference on Wireless Network Security (WiSec '11), Jun. 2011, 12 pgs.

Characters That Are Valid for User IDs And Passwords, Retrieved from: https://web.archive.org/web/20210702183515/https://www.ibm.com/docs/en/baw/19.x?topic=security-characters-that-are-valid-user-ids-passwords, Jul. 2, 2021, 6 pages.

Hash Functions, Retrieved from: https://web.archive.org/web/20171031122342/https://csrc.nist.gov/projects/hash-functions, Oct. 31, 2017, 5 pages.

IEEE 754 Calculator, Retrieved from: https://web.archive.org/web/20161220073314/https://weitz.de/ieee/, Dec. 20, 2016, 2 pages.

Online Hash Calculator, Retrieved from: https://web.archive.org/web/20070907102617/https://www.tools4noobs.com/online_tools/hash/, Sep. 7, 2007, 1 page.

* cited by examiner

250

CREATE DIGITAL TWIN — S255

COLLECT AND COMMUNICATE OPERATIONAL DATA OF THE VEHICLE — S260

UPDATE THE DIGITAL TWIN — S265

DERIVE THE PASSWORD — S270

AUTHENTICATE VEHICLE DRIVER USING THE PASSWORD — S275

PROGRAM 300

DIGITAL TWIN DATA SET    302

INPUT MOD    304

PROCESSING MOD    306

AUTHENTIFICATION MOD    310

400

VEHICLE SUBSYSTEM  104

ODOMETER: 150,000 MILES

ENTER PASSWORD:
150000

YOU ARE NOW
AUTHENTICATED.
YOU MAY NOW START
THE VEHICLE.

105

TECHNOLOGY FOR USING A SIMULATED STATE OF A DIGITAL TWIN AS A PASSWORD

BACKGROUND

The present invention relates to digital twins. As indicated in the title, digital twins are used in password creation. More specifically, what is meant by this is that passwords are created using simulated states of Digital Twins.

The Wikipedia entry for "Digital Twin" (as of Feb. 2, 2022) states, in part, as follows: "A digital twin is a virtual representation that serves as the real-time digital counterpart of a physical object or process . . . . Digital twins are the result of continual improvement in the creation of product design and engineering activities. Product drawings and engineering specifications progressed from handmade drafting to computer aided drafting/computer aided design to model-based systems engineering. The digital twin of a physical object is dependent on the digital thread—the lowest level design and specification for a digital twin—and the 'twin' is dependent on the digital thread to maintain accuracy. Changes to product design are implemented using engineering change orders (ECO). An ECO made to a component item will result in a new version of the item's digital thread, and correspondingly to the digital twin. The digital twin concept consists of three distinct parts: the physical product, the digital/virtual product, and connections between the two products. The connections between the physical product and the digital/virtual product is data that flows from the physical product to the digital/virtual product and information that is available from the digital/virtual product to the physical environment." (footnote(s) omitted)

The Wikipedia entry for "Simulation" (as of Feb. 23, 2022) states, in part, as follows: "A simulation is the imitation of the operation of a real-world process or system over time. Simulations require the use of models; the model represents the key characteristics or behaviors of the selected system or process, whereas the simulation represents the evolution of the model over time. Often, computers are used to execute the simulation. Simulation is used in many contexts, such as simulation of technology for performance tuning or optimizing, safety engineering, testing, training, education, and video games. Simulation is also used with scientific modelling of natural systems or human systems to gain insight into their functioning, as in economics. Simulation can be used to show the eventual real effects of alternative conditions and courses of action. Simulation is also used when the real system cannot be engaged, because it may not be accessible, or it may be dangerous or unacceptable to engage, or it is being designed but not yet built, or it may simply not exist. Key issues in modeling and simulation include the acquisition of valid sources of information about the relevant selection of key characteristics and behaviors used to build the model, the use of simplifying approximations and assumptions within the model, and fidelity and validity of the simulation outcomes. Procedures and protocols for model verification and validation are an ongoing field of academic study, refinement, research and development in simulations technology or practice, particularly in the work of computer simulation." (footnotes omitted). Some different types of simulation mentioned in this Wikipedia entry include: clinical healthcare, manufacturing, automobiles, biomechanics, cities, classrooms, finance, flight and marine.

SUMMARY

According to an aspect of the present invention, there is a method, computer program product and/or system that performs the following operations (not necessarily in the following order): (i) create a first digital twin corresponding to a first piece of hardware; (ii) receiving an operational data set including data indicative of operation of the first piece of hardware in the real world; (iii) updating the first digital twin based on the operations of the first piece of hardware as indicated in the first operational data set; (iv) deriving a first password based on the updated digital twin; and (v) authenticating a first user based on the first password.

According to an aspect of the present invention, there is a method, computer program product and/or system that performs the following operations (not necessarily in the following order): (i) create a first digital twin corresponding to a first piece of hardware; (ii) receiving an operational data set including data indicative of operation of the first piece of hardware in the real world; (iii) updating the first digital twin based on the operations of the first piece of hardware as indicated in the first operational data set, with the updating including: (i) providing a set of input value(s) to a simulator program, with the set of input value(s) being based on the operational data set, and (ii) running the simulator program to obtain a set of output value(s); (iv) deriving a first password by hashing the set of output value(s); and (v) authenticating a first user based on the first password.

According to an aspect of the present invention, there is a method, computer program product and/or system that performs the following operations (not necessarily in the following order): (i) create a first digital twin corresponding to a first process; (ii) receiving an operational data set including data indicative of operation of the first process in the real world; (iii) updating the first digital twin based on the operations of the first process as indicated in the first operational data set; (iv) deriving a first password based on the updated digital twin; and (v) authenticating a first user based on the first password.

DETAILED DESCRIPTION

Figure 1:
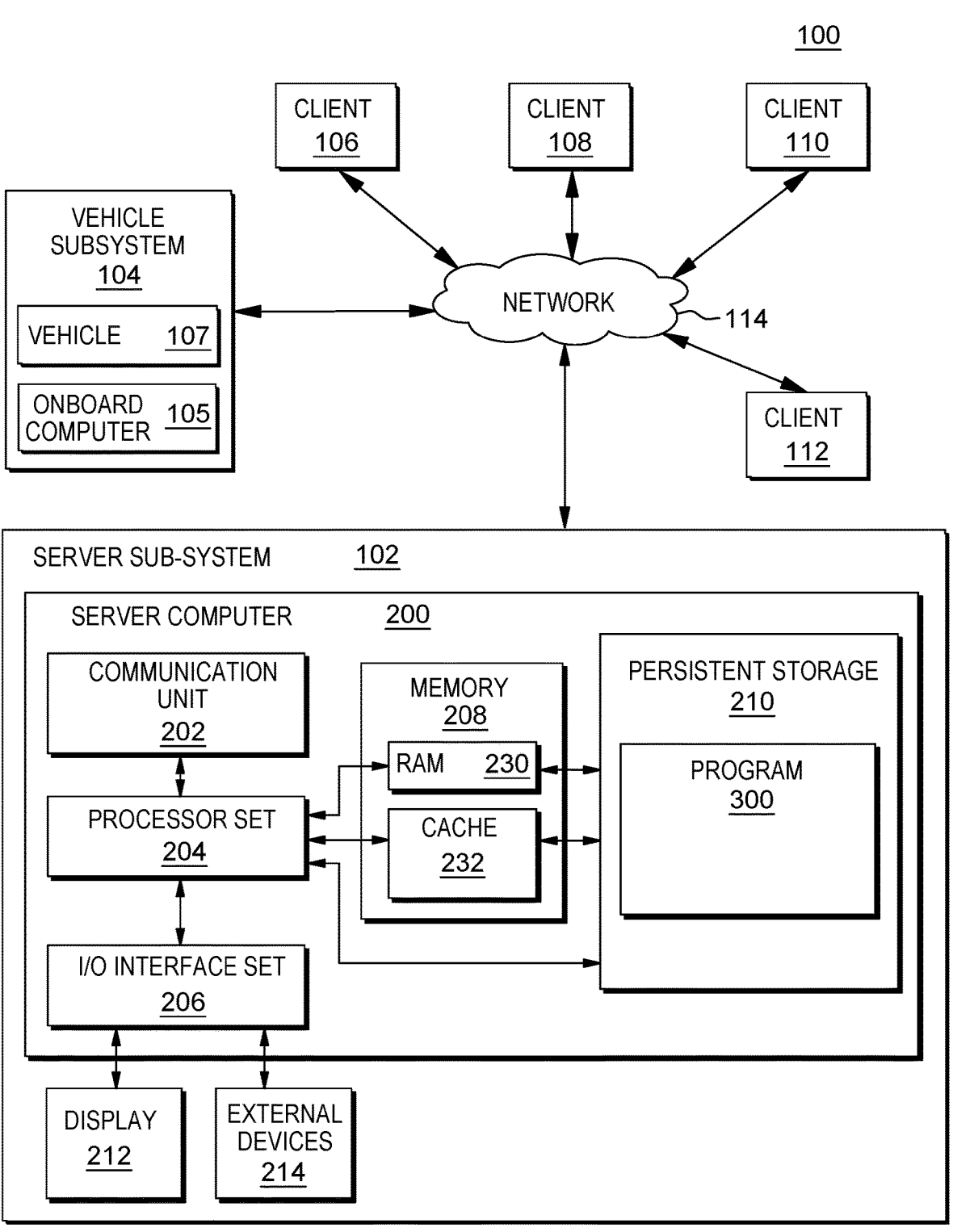
FIG. 1 is a block diagram of a first embodiment of a system according to the present invention.

Some embodiments of the present invention are directed to a method (and associated computer software/hardware) for performing authenticating access to a system comprising: (i) determining at least one digital twin corresponding to a user; (ii) DT receives certain input values; (iii) based the type and value of the inputs, the DT produces an output, or, in computer engineering terms, changes its "state"; (iv) authenticating the user based on the generated value matching a stored value; and (v) based on the authentication, granting access to the system. A digital twin of a complex entity can have innumerable states based on the input values. In some embodiments, a new password can make an effect on a selected digital twin with one input or a sequence of inputs. The resulting state, which is known only to the service provider, can act as a password.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); vehicle subsystem 104 (including vehicle 107 and onboard computer 105); client subsystems 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figures 2, 3:
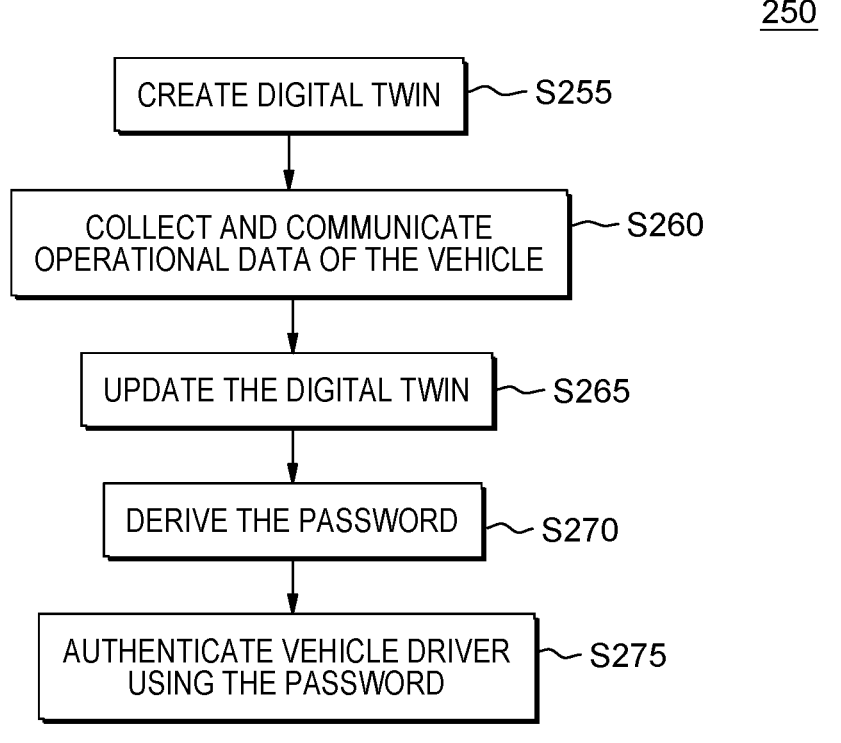
FIG. 2 is a flowchart showing a first embodiment method performed, at least in part, by the first embodiment system.
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where processing module ("mod") 306 creates a digital twin data set 302 (that is, a digital twin) of vehicle 107. This digital twin is created in the currently conventional way, so this operation S255 is not discussed in detail. In this example, the thing corresponding to the digital twin is a piece of hardware (that is, a car), rather than a process. Alternatively, the digital twin could correspond to a different type of hardware or correspond to a process. In this example, the digital twin is created by processing mod 306 itself. Alternatively, in other embodiments, the digital twin: (i) has been created on a computer other than computer 200; and (ii) the creation of the digital twin data set includes selecting or picking picking one or more DTs and for each inputting one or more sets of input values to create the digital twin data set. In this simple embodiment, there is only one DT that is used in generating a password, as discussed below. Alternatively, there may be multiple DTs and the combined final state(s) of all DTs picked form the password.

Before proceeding with the discussion of the example of flow chart 250, the reader is cautioned that this example, is only an example, and a simple pedagogical example at that—it is meant to show concepts underlying various embodiments of the present invention. However, the details presented in this discussion should not be taken as limiting the scope of the present invention, except as these details may be called out in the claims (see below) portion of this document. For example, while the example of flow chart 250 focuses on the example of a car and its associated DT, the present invention is not limited to cars (unless a claim specifies that). Processing proceeds to operation S260, where onboard vehicle computer 105 sends operational data relating to the maintenance and use of vehicle 107 to input mod 304. In this particular example, the relevant attributes of this operational data include: (i) an initial odometer reading; and (ii) a set of location information including an intermittent series of locations where the vehicle is located (for example, at 1 PM the vehicle is at $4^{th}$ and Main in Anytown USA, at 2 PM the vehicle is in the parking lot of Mount Rushmore and so on). These pieces of operational information may be thought of as inputs to the digital twin and they will be applied to the digital twin in this example in the next operation of flow chart 250. These new inputs to the digital twin should not be confused with the inputs used to create the initial state version of the digital twin, which are received at the time the DT is first received/created. In this example, the relevant operational inputs to the digital twin is a simple hourly location of the vehicle. Alternatively, and perhaps more realistically, the operational inputs to the digital twin may include many data streams of input data corresponding to many and various input types. For example, for the digital twin of a car, the typical operational inputs may include the inputs can be gas through accelerator, applying brakes, changing gears, etc. However, in this simple pedagogical example, the relevant operational inputs have been limited in number and type so that readers may more easily understand the underlying concepts.

Processing proceeds to operation S265, where processing mod 306 updates the digital twin data set to reflect the new operational inputs received at S260. As part of updating the digital twin, processing mod 306 updates odometer data for digital twin data set 302, and it is desired to make this update correspond as closely as possible with the actual hardware-based odometer of vehicle 107. Accordingly, processing mod 306 includes a simulator (not separately shown in FIG. 3). The location information, obtained at operation S260, is fed to the simulator as input data so that the actual travel of vehicle 107 can be simulated. More specifically, in this example, the road from $4^{th}$ and Main to the Mount Rushmore parking lot is 52 miles, so the virtual odometer of digital twin data set 302 updates from 149,948 miles to 150,000 miles. As shown in diver's view 400 of FIG. 4, this odometer reading of updated digital twin data set 302 exactly matches the actual odometer reading that shows on the dashboard of the actual, real world vehicle.

Figure 4:
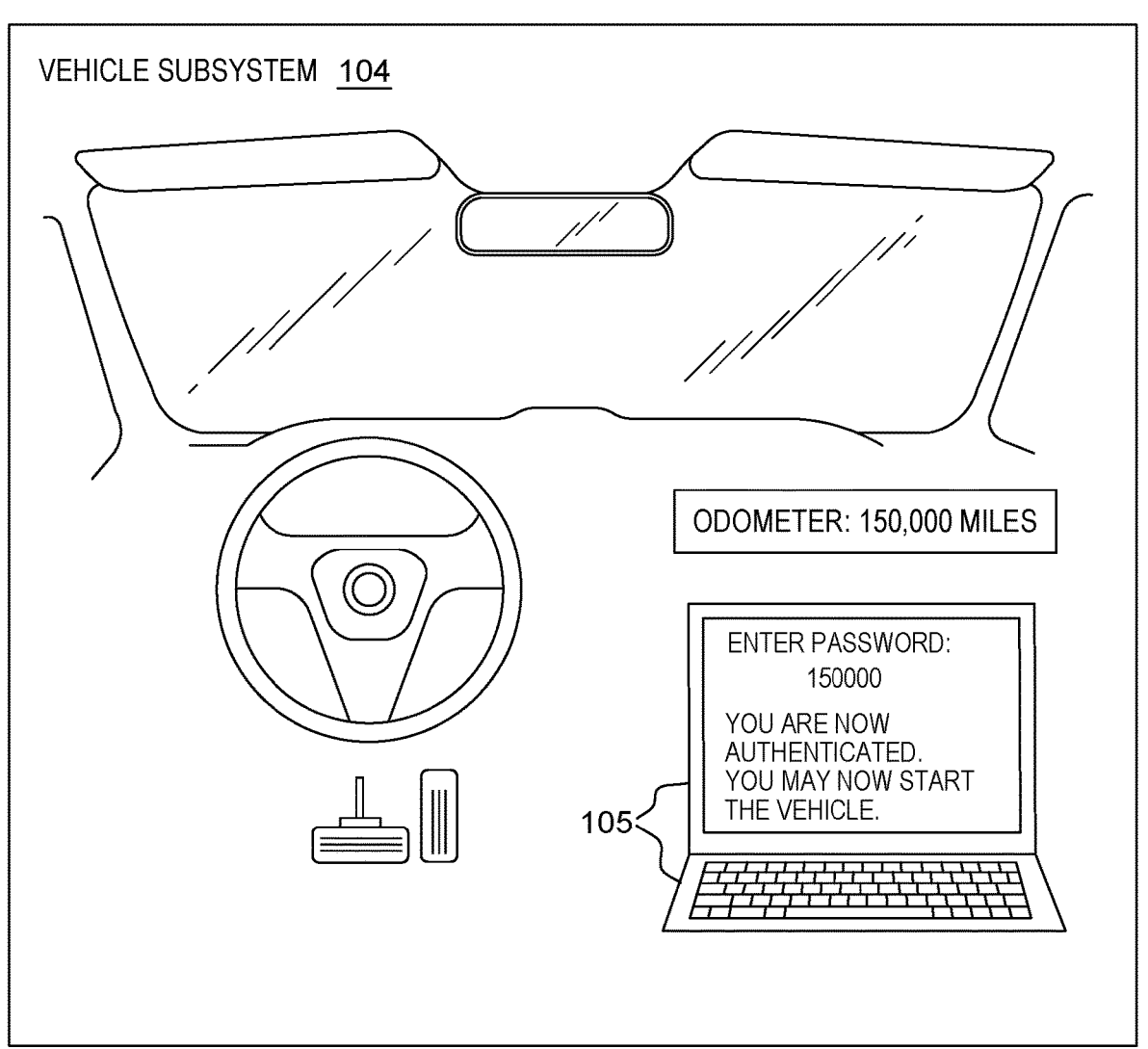
FIG. 4 is a driver's seat view of a vehicle used in connection with an example of the present invention.

Processing proceeds to operation S270, where processing mod 306 derives a password based on the running of the simulator of processing mod 306 on digital twin data set 302. At this point, it is noted that one aspect of some embodiments of the present invention involves certain, somewhat complex numerical algorithms, as explained in detail in the next section of this Detailed Description section. However, in the example under discussion, the derivation of the password from the updated digital twin is purposely kept simple so that fundamental concepts underlying the invention are better understood by the reader. More specifically, in this example, the password is the odometer reading of the vehicle, as shown in FIG. 4. While this example is based on a single attribute of the corresponding vehicle/digital twin pair (that is, odometer reading attribute), as explained in the next sub-section of this Detailed Description section, the password may be derived based on multiple attributes of the hardware (or process)/digital twin pair. In this embodiment, the code of the DT and the limited operational inputs lead to the password in a fairly direct way, and hopefully this will help readers understand the basic concept of deriving a password from the operations of a DT. Alternatively, in some preferred embodiments, the resulting final state of the operations on one or more selected DTs form the password. Either way, the password is derived through operating the real world counterpart of the DT, getting operational inputs about this to the DT and then using the operational state of the DT data set as the basis for derivation of a dynamic password.

Processing proceeds to operation S275, where a user authenticates, through onboard computer 105 and authentication mod 310, using the password derived at operation S270, again, as shown in FIG. 4. In this example, the single password is sufficient to fully authenticate the user. Alternatively, and as will be appreciated by those of skill in the art, the password may be only one factor in a multi-factor authentication test.

III. Further Comments and/or Embodiments

Some embodiments of the present invention recognize the following facts, potential problems and/or potential areas for improvement with respect to the current state of the art: (i) creation of nearly impossible to break passwords are always a challenge and headache; (ii) many systems these days employ a primary password and a secondary password that are more personal like mother's maiden name, name of high school from where you graduated, first car you bought, etc.; and/or (iii) many of such standard secondary authentication passwords are very susceptible for easy breakage.

Some embodiments of the present invention recognize the following facts, potential problems and/or potential areas for improvement with respect to the current state of the art: (i) passwords get more secure—usually referred to as the password's strength (strength is generally measured by the number of guesses it would take to crack the password)—as they become more complex, and there are factors that contribute to strength; (ii) password strength may include: (a) entropy, which is basically a measure of randomness between characters/elements, and (b) the second is the length or size of the password; (iii) common wisdom, until recently, has been that increasing entropy is the best way to increase complexity; (iv) many websites force you to use special characters, numbers and capital letters when building a password; and/or (v) more recent research says that it is actually the length that makes passwords stronger than entropy.

Some embodiments of the present invention recognize the following facts, potential problems and/or potential areas for improvement with respect to the current state of the art: (i) a digital twin (DT) is a virtual representation of an object or system that spans its lifecycle; (ii) a digital twin is updated from real-time data, and uses simulation, machine learning and reasoning to help decision-making; (iii) digital twins are powerful masterminds to drive innovation and performance (as an example, imagine it as your most talented product technicians with the most advanced monitoring, analytical, and predictive capabilities at their fingertips; (iv) a digital twin can be thought of as a bridge between the physical and digital world; (v) a digital twin uses smart components that use sensors to gather data about real-time status, working condition, or position which are integrated with a physical item; (vi) digital twin components are connected to a cloud-based system that receives and processes all the data the sensors monitor; and/or (vii) digital twin input is analyzed against business and other contextual data.

Some examples of types of digital twin that can be used in connection with various embodiments of the present invention are models of automobile engines, windmills, artificial heart, engineering structural models, a lighting simulation system, a flight simulator", video games, sports/games training SW (software), CAD (computer-aided design) models, etc. Some embodiments utilize complex simulation models which behave very much like their "real world" physical counterparts. In some embodiments, the digital twin is a functionally independent components such as a digital twin dedicated to a given air bag in a given automobile. Some embodiments implement an approach with a dynamic system that can take a multitude of numeric values as inputs resulting in a unique state, which can be enumerated/measured and can be used as a password.

Some embodiments of the present invention may include one, or more, of the following operations, features, characteristics and/or advantages: (i) uses DTs to provide many more combinations of states than static shape manipulation; (ii) uses DTs where the technique is different, stronger, and valuable; (iii) strengthens the password by itself; (iv) generates a very strong password based on final state of the digital twin with multiple sequences of inputs; and/or (iv) uses DTs to generate a password.

Some embodiments of the present invention may include one, or more, of the following operations, features, characteristics and/or advantages: (i) includes the use of any user selectable DT; (ii) includes the manipulation of different input variable values which are fed in a sequence and uses the resulting final state of DT as the secondary authentication (for example, The final state as a result of the a sequence of inputs fed to a DT can be transformed (to generate a hash code) to use as a password); (iii) supports a large set of digital twins which are offered as choices of password elements from which the user can set up/create a password by selecting "N" number of DTs (the larger the N, the stronger the password); (iv) the DTs selected and the sequence of their selection are part of the password (more specifically, the DTs and the inputs are not the password—rather, the resulting final state of the operations on one or more selected DTs form the password); (v) the DTs can enable operations where these operations are part of the password, such as providing a sequence of input data and using the output state parameter values to create the password; (vi) the DTs selected and the sequence and combination of the above operations, due to input values, provides trillions of combinations of passwords that may take years to break with brute force methods; and/or (vii) a combination of valid inputs (parameters) and a sequence of such sets would lead to a resulting state and a digital representation of the resultant state parameters that would serve as the password.

Some embodiments of the present invention may include one, or more, of the following operations, features, characteristics and/or advantages: (i) includes a standard hashing scheme on the output values; (ii) includes recommending certain steps to reduce bias and unmask any common patterns; (iii) the two major characteristics that make a password attractive-complex to break by hackers but easy to remember by the user—can be fully supported; (iv) includes being valuable to data security organizations since trillions of dollars are lost regularly because of hacking into passwords every year; and/or (v) the small set of discrete inputs to the DTs produce complex real output values which are hashed to generate a long complex character pattern of about $16^{128}$ combinations.

The most important aspects of the present invention is that it strongly satisfies many desirable features of an ideal password including: (i) it is easy and simple to remember (the inputs to the DT can be discrete and easy to remember); (ii) the combinations are innumerable and have huge strength characteristics against breaking; (iii) implementation is not complex (DTs are plentiful, hashing algorithms are standard, although bias reduction and pattern deidentification is recommended); and/or (iv) there is no extra overload from the server/provider side to handle this scheme.

An embodiment of a method according to the present invention has nine operations which will be respectively discussed in the following nine (9) paragraphs.

FIRST OPERATION: As a pre-configuration step, the user selects one or more digital twins from a list presented by the server/provider to be used for secondary authentication. For each DT, the user selects a series of input settings that are relevant to the selected set DTs. See the examples below for the types of inputs and their sequence. The sequence of applying the input combinations is important to generate the unique state of the DTs. The operations are captured in discrete steps. These operations can be either be done by operating the electronic controls, voice commands, or running a command file as below:

```
Input 1 – (Variable__a__value__a1, Variable__b__value__b1...., ...,)
Input 2 – (Variable__a__value__a2, Variable__b__value__b2...., ...,)
Input 3 – (Variable__a__value__a3, Variable__b__value__b3...., ...,)
.......
Input n – (Variable__a__value__an, Variable__b__value__bn...., ...,)
```

The sequence of the input data sets would result in an output state of the chosen DT as follows:

```
Output n—(Parameter P1_value_T1,
          Parameter_P2_Value_T2)
```

These parameter values are used to compute a "hash code" that can be used as a secondary authentication code. The system running on the user's device generates a one-way hash for the modified state(s) of the selected DT(s). If there are continuous variable, appropriate "floors" or "ceilings" can be defined to make the decimal values or fractions to discrete values to make sure they are reproducible. The system transmits the info of the selected DT(s) and the one-way hash to a central server (NOTE—the modified state is not saved). The original DT needs to be sent only when the user uses a clip from his personal library. Neither the DT modification operations nor the modified DT is stored anywhere. This ensures that user access is not compromised even if the central server or the user's device is hacked. The DT modification operations are thus known only to the user thus effectively replicating the second factor on any device.

SECOND OPERATION: The user may pick a reasonable number of—say from 1 to 3 DTs. Obviously, the more the number, the stronger the password will be, although it may take more time to log in. The large set of DTs and huge variations of input values and their sequences make the combination very large in the order of billions of combinations as opposed to alphanumeric-special character set.

THIRD OPERATION: The DTs can be either supplied by the server (authenticating agency) or User may pick one from his personal library too. For convenience of logging from different devices, these may be kept in a personal cloud storage along with many other potential DT files which are not part of the specific password. Also, the user may download the library from the server provided to personal cloud space or personal device.

FOURTH OPERATION: The system is triggered when the user is challenged for secondary authentication.

FIFTH OPERATION: The central server picks one of the user chosen DTs and sends it to the component running on the user device.

SIXTH OPERATION: On the device, the user is challenged to replicate the DT modification operations.

SEVENTH OPERATION: The output of DT's is feed into a hash unit to produce the password. This hash step has two purposes: (i) Normalize the DT's output into correct form and range of the valid password format specified by the server (example(s) provided herein show how a password can be generated from DT output via a standard hash algorithm); and (ii) by going through the hash algorithm, the password is evenly distributed in the valid password space, maximizing the possible complexity of the passwords allowed by the server. The details of the hashing scheme are described herein.

EIGHTH OPERATION: The one-way hash is transmitted back to the central server.

NINTH OPERATION: The central server matches the hash to the original one-way hash. If they match, the user is assumed to have passed secondary authentication. The user may specify to fully authenticate with any one or all operations done on the DT. Any one operation is the least secured, and all provide the most secured passwords. When a subset of operations is chosen, multiple hashes need to be created for each of the operation and all operations the server can store all the hashes are potential choices. The hashes as well as the original DT file (if is not on the server presented list) will be sent to the server during initial configuration and the password is set up. The original DT file will be sent back to the user only in a secured password recovery reset scenario. This would ensure that no one can interrupt.

According to a method of the present invention, a digital twin manipulation/simulation where the password code is generated, will now be described: (i) the user is presented with a choice of DT models and the types of inputs corresponding to each of these DT models; (ii) the user picks a DT as the base model; (iii) the user can optionally use a new DT from his/her local collection and if so, as part of setting up the password, the new DT is also conveyed to the server/provider; (iv) for each DT, the user selects a initial state of the asset SO; (v) the user changes the input variables (I1-In) to different values where the DT is now in a new state S1; (vi) the user changes another subset of input variables (I1-In) where the DT is now in state S2; (vii) the above sequence is continued for a number different state changes where the asset is now in a final state Sf; (viii) the parameters of the final state Sf are now used make computations using hashing algorithms to come up with the password; (ix) the new password is sent to provider and provider securely stores the same and sends a confirmation to the user; and (x) the user optionally sends the DT information in case the user wants to get it back as a reminder (just in case the local DT is lost).

Figure 5:
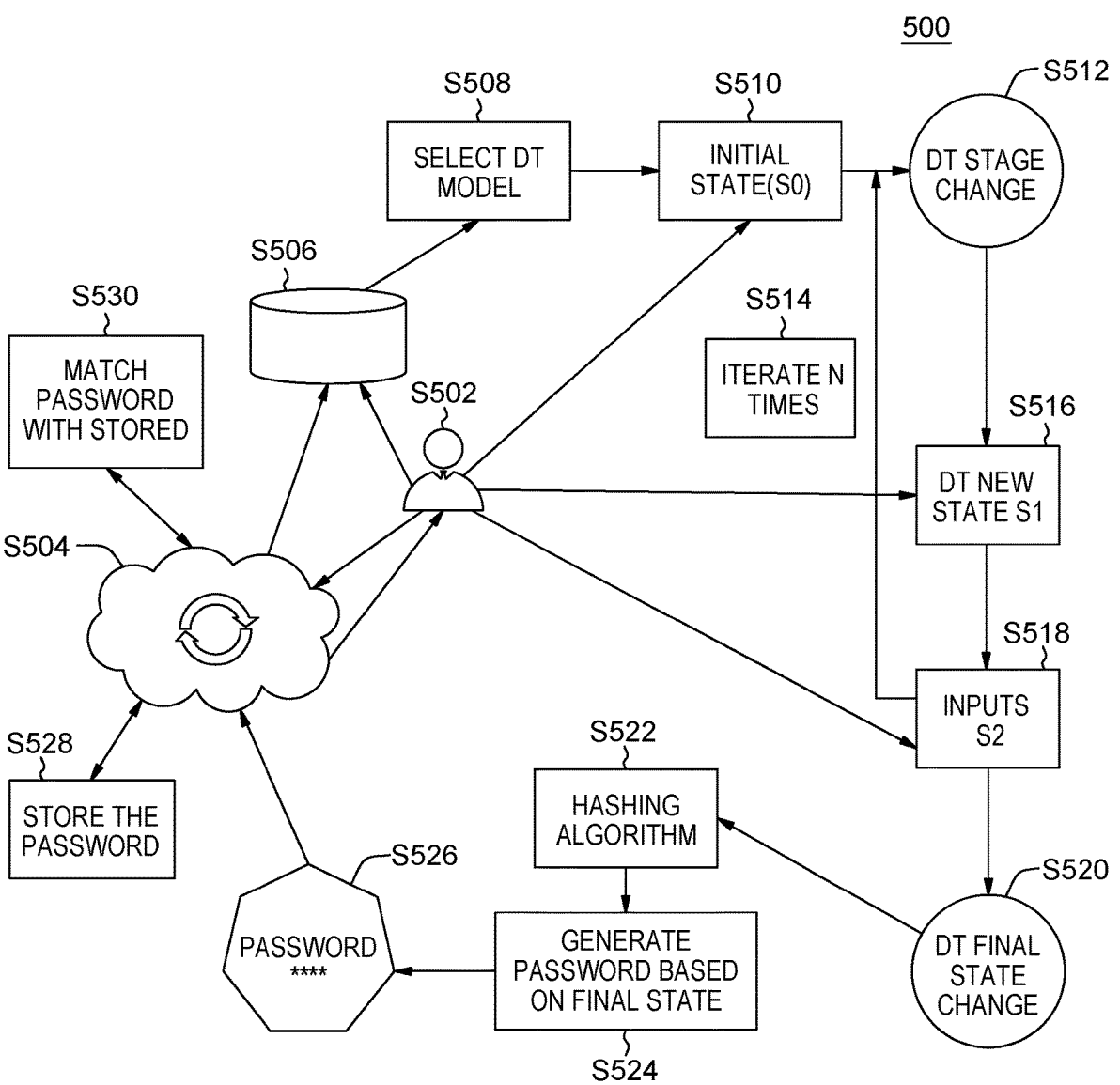
FIG. 5 is a flowchart showing a second embodiment of a method according to the present invention.

As shown in flowchart 500 of FIG. 5, methods for storing a user password and later authenticating the user based on the password include the following operations (with process flow among and between the operations as shown by the arrows in FIG. 5): S502; S504; S506; S508; S510; S512; S514; S516; S518; S520; S522; S524; S526; S528; and S530. Operation S528 is performed when a new password is stored. Operation S530 is performed when the new password is used to, at least partially, authenticate the user.

The process of user authentication (see method 500 at operation S530) includes the following operations: (i) the user logs in with standard password; (ii) if the password is authenticated, a secondary authentication of a new novel procedure is employed as described in the operations below;

(iii) the user is presented with a choice of DT models and the types of inputs corresponding each of these DT models; (iv) the user picks a DT as the base model; (v) for each DT, the user selects an initial state of the asset S0; (vi) the user changes the input variables (I1-In) to different values; (vii) the DT then goes to a new state S1; (viii) the user changes another subset of input variables (I1-In); (ix) the DT is now in state S2; (x) the above sequence is continued for a number different state changes; (xi) the asset is now in a final state Sf; (xii) the parameters of the final state Sf are now used make computations using hashing algorithms to come up with the password; (xiii) the password is sent to the providers server/cloud; (xiv) the provider matches the password with the securely stored password; and (xv) the provider either accepts the user in or makes a rejection based on the match.

Consider a first example involving a Digital Twin of an Automobile. This Digital Twin can accept various inputs such as fuel (intake)/throttle, pressure on the breaks, the gear direction, in simple terms (there can be many different test inputs based on detailed engineering structure). The inputs in this example are: Fuel Injection (FI), Load (LO), Coolant Temperature (TE), and Gravitation Force (depending on level of plane) (GF). In this example, the output parameters: Motor RPM (RPM), Horsepower (HP), Speed/Acceleration (SP), Distance Travelled (DIS). Now, in a simple scenario, one can feed different combinations of input values for FI, LO, TE, and GF and each step, the output parameter values can be different, as sequence through multiple sets of inputs, the DT reaches a final state measured in terms of RPM, HP, SP, and DIS. These four parameter values of the final state can be hashed to compute the secondary authentication password. Hash is a mathematical algorithm that maps data of arbitrary size to a bit array of a fixed size. It is widely used for data security. Among other properties, hashes are designed so that the output is evenly distributed in their range. For example, output SHA-512 is a 128 digits hexadecimal number. If a user runs SHA-512 with different sets of data as inputs, the outputs will be evenly distributed in space of $[1, \ldots, 16^{128}]$. There are many hash algorithms, seven of them are approved by FIPS 180-4 Secure Hash Standard. They are, SHA-1, SHA-224, SHA-256, SHA-384, SHA-512, SHA-512/224, and SHA-512/256[1]. For purpose of demonstration, consider an automobile DT example to show how passwords can be generated. Assume for a given set of inputs, {FI, O, TE, GF, N}, where N is precision of the real variables being used in the DT. N needs to be specified in order to get the output of the DT deterministically for the given input.

A step by step demonstration of how a password can be generated by embodiments of the present invention is set forth below:

1. select input and precision to the DT. {FI, O, TE, GF, N}

2. Run the DT and get the output in digital form as shown by the following computer code:

```
{RPM, HP,  SP(km/s), DIS(m)} = {6150.05 =
1.1000000001100000110011001100110011001100110011001101x2^(
1.0000001011)
   192.8 =
1.1000000110011001100110011001100110011001100110011010x2^(
1.0000000110)
   26.8224 =
1.1010110100101000100011001110011100000011101011111011x2^(
1.0000000011)
   3218.69 =
1.1001001001010110000101000111101011100001010001111011x2^(
1.0000001010)  }
```

To avoid the range bias of the output, only the precision bits for the calculation are taken. The bits are stacked together as follows:

```
1000000001100000110011001100110011001100110011001101100000110011
0011001100110011001100110011001100110101010101101001010001000110011
1001110000001110101111101110010010010101100001010001111010101110000
1010001111011
```

For demonstration, apply SHA-512 hash algorithm to the bits above to get the following 128 digit hexadecimal number:

bdfdd5beba5f1b53a097587a8da78941de42914d33b75ac0a1c44a6
a504ff38ade67a6abef2bc2521d0f19afbe1db4fb3832612560++++
07b4f942fcfb39d4abf0f0

The range of the output is $16^128$, that is, has $16^128$ variations. The above hexadecimal number needs to be turned into a valid password. For demonstration, a pre-existing standard is used, which has 80 valid characters. There is also an assumption that the max length of password allowed by the server is 64. Then the total variations of the passwords are $80^64$. Notice $80^64 << 16^128$. So, the possible hash values can cover all possible passwords. For example, if every 2 hex digits is mapped into 1 valid characters, using modular arithmetic, the following password is obtained as follows:

Fn5GCpDda@iS-h9}._}*3xkIbM%Ca=d!.xgl =
TKcFpBpGFul82rNqhuj_ml94laa

Because a password generated by the above operations is evenly distributed in the space of all possible passwords, the password can't be guessed by patterns. With 64 bits of length, it is impractical to break it by brute force as well.

According to embodiments of the present invention, the most important aspect of the present invention is that it strongly satisfies many desirable features of an ideal password including: (i) it is easy and simple to remember (the inputs to DT can be discrete and easy to remember operations); (ii) the combinations are innumerable ($16^128$ variations) and has a huge strength against being broken; (iii) implementation is not complex (DTs are plentiful, hashing algorithms are standard, although bias reduction and pattern deidentification is recommended); and/or (iv) there is no extra overload on the server/provider side to handle this scheme.

If longer passwords are really needed, the number of characters in the password can be further increased by different ways (for example, instead of using final output of the DT, the system could save states of the DT at given intervals, then several DTs will be outputted). Then, longer passwords can be generated.

An example involving a digital twin corresponding to a Building Structure will now be discussed. The digital twin is a complete virtual representation of a piece of equipment, combining design, asset and process data in a complex model. In this example, the use of a digital twin for building maintenance is considered. The twinning technology can monitor the usage of the Heating, Ventilation, Air Conditioning (HVAC), as well as lightening, by optimizing it and thereby reducing the operational costs. Moreover, Digital Twin Building Maintenance allows to detect problems at an early stage, predict when something going to fail, and suggest fixing measures.

For explanation purposes, let us select 5 input variables: (i) Atmospheric Temperature (average)—(−20 to 110 degree F.); (ii) Humidity (external) (1 to 120%); (iii) Number of equipment inside the building (0 to N); (iv) Number of people inside (0 to M); (v) HVAC Unit Power (Total) (0.5 BTU to N BTU); and (vi) Time after which HVAC put ON (0 hour to 24 hours).

The output parameters that will be measured/monitored are (to the accuracy of K decimal points)—or say 32 bit resolution: (i) Inside temperature (−20 to 120 degree F.); (ii) Humidity (1 to 120%); and (iii) Power Consumption (0 to 10 MW).

There can be a number of other $CO_2$ emission, HVAC unit operation time, Fan speed, etc., more deep technical aspects. A simple scenario of operating the Digital Twin for HVAC is by providing random set of values for the input variables in a time sequence and then recording/measuring the final output parameters. The discrete values of the output parameters can be the input to the Hashing algorithm to generate one unique password number to be used as secondary authentication.

A method for performing consistent replay includes: (i) prescribes taking the range of the output values of events which makes it consistently reproducible by the owner of the password; (ii) the user has the flexibility to choose any one of the operations as the password of the authentication; and (iii) at the same time, authentication with all operations obviously makes the password much stronger.

Some embodiments of the present invention may include one, or more, of the following operations, features, characteristics and/or advantages: (i) includes the use of any user selectable DT and the manipulation of the same as different input variable values are fed in a sequence and using the resulting final state of DT as the secondary authentication; (ii) supports a large set of digital twins offered as choices of elements of a password from which the user may set up/create a password by selecting "N" number of DTs (larger the N, the stronger the password); (iii) the DTs selected and the sequence of their selection are part of the password; (iv) the DTs are enabled to perform some operations on them and these operations are also part of the password, such as providing a sequence of input data and using the output state parameter values to create the password; (v) the DTs selected and the sequence and combination of the above operations, due to input values, provides trillions of combinations of passwords that may take years to break with brute force methods; and/or (vi) a combination of valid inputs (parameters) and a sequence of such sets would lead to a resulting state and a digital representation of the resultant state parameters that would serve as the password.

Some embodiments of the present invention may include one, or more, of the following operations, features, characteristics and/or advantages: (i) uses a large set of "digital twins" which are simulation models of different types of physical objects/machines/systems, picking one or more of them and using a sequence of inputs and using the final end state as the password; (ii) provides a stronger and more sophisticated implementation; (iii) provides multiple orders of magnitude of password possibilities; and/or (iv) uses one or more digital twins and the final output state(s) of the selected digital twins are combined to use as password.

Some embodiments of the present invention may include one, or more, of the following operations, features, characteristics and/or advantages: (i) includes more selections, including discrete and continues variables, digital twins; (ii) is easy to remember what is needed to re-generate the password; (iii) has no range limitation because smaller changes and flexibility of digital twins are considered; (iv) includes non-biased distribution of full range of allowed passwords by the server; (v) digital twin method has more variety of types and is much harder to guess; (vi) varieties of initial condition to the chaos system is also limited; (vii) the digital twin can have a wide range of initial conditions with different parameter types; (viii) the output range is also restricted by the chaos system used; and/or (ix) uses the stack of significant bits as a password base, allowing selection of any range.

Some embodiments of the present invention may include one, or more, of the following operations, features, characteristics and/or advantages: (i) includes more selections, including discrete and continues variables, digital twins; (ii) is easy to remember what is needed to re-generate the password; (iii) because significant bits and flexibility of digital twins are used, there is no range limitation; and/or (iv) includes a non-biased distribution of full range of allowed passwords by the server.

Some embodiments of the present invention may include one, or more, of the following operations, features, characteristics and/or advantages: (i) includes many digital twins to choose from; (ii) each digital twin could use different numbers of variables where some variables are continue values; (iii) the number of combined initial "positions are literary countless; (iv) prevents hackers from guessing and using a targeted method to break the password; (v) has simple terms to remember, yet can generate a full spectrum of the random passwords; (vi) maximizes the randomness for given capacity (the number of bytes allowed by server); (vii) does not include range limitations; (viii) the digital twin system can be used to generate any length of password(s); (ix) passwords can satisfy any restriction imposed by the server's login logic; (x) can fill up all possible passwords allowed by the server; (xi) uses the stacks of significant bits of the results; (xii) eliminates the characteristics of the particular digital twin itself; and/or (xiii) can generate non-biased distribution of a full range of passwords allowed by the server.

Some embodiments of the present invention may include one, or more, of the following operations, features, characteristics and/or advantages: (i) uses one or more digital twin and the final output state(s) of the selected digital twins are combined to use as password; (ii) digital twin have more variety of types and are much harder to guess; (iii) digital twin can have a wide range of initial conditions with different parameter types which are harder to guess; (iv) uses the stack of significant bits as a password base, allowing any range to be selected; and/or (v) focuses on the security of the password.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/ or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
creating a plurality of digital twins each corresponding to one of a plurality of pieces of hardware;
operating the plurality of digital twins in a real world;
receiving an operational data set including data indicative of the operating of the plurality of pieces of hardware in the real world;
updating the plurality of digital twins, based on the operating of the plurality of pieces of hardware in the real world as indicated in the operational data set, as a plurality of real world counterparts of the plurality of digital twins;
deriving a first password based on the plurality of real world counterparts of the plurality of digital twins; and
authenticating a first user based on the first password, wherein the first password is stronger as a number of the plurality of digital twins increases.

2. The CIM of claim 1, wherein the updating the plurality of digital twins includes using the plurality of digital twins in a simulator program so that updated digital twin data results from the using of the simulator program.

3. The CIM of claim 1, wherein the creating the plurality of digital twins includes selecting at least one pre-existing digital twin corresponding to the plurality of pieces of hardware.

4. The CIM of claim 1, wherein the deriving of the first password includes:
receiving a set of output values from the plurality of real world counterparts of the plurality of digital twins; and
generating a first password string based on the set of output values.

5. A computer-implemented method (CIM) comprising:
creating a plurality of digital twins each corresponding to one of a plurality of pieces of hardware;
operating the plurality of digital twins in a real world;
receiving an operational data set including data indicative of the operating of the plurality of pieces of hardware in the real world;
updating the plurality of digital twins, based on the operating of the plurality of pieces of hardware in the real world as indicated in the operational data set, as a plurality of real world counterparts of the plurality of digital twins, with the updating including: (i) providing a set of input value(s) in a sequence to a simulator program, with the set of input value(s) being based on the operational data set, and (ii) running the simulator program to obtain a set of output value(s);
deriving a first password by hashing the set of output value(s) and based on the plurality of real world counterparts of the plurality of digital twins; and authenticating a first user based on the first password, wherein the first password is stronger as a number of the plurality of digital twins increases.

6. The CIM of claim 5, wherein the creating the plurality of digital twins includes selecting at least one pre-existing digital twin corresponding to the plurality of pieces of hardware.

7. The CIM of claim 5, wherein the first user controls the operating the plurality of pieces of hardware.

8. The CIM of claim 5, wherein the set of output value(s) are complex and real, and the hashing of the set of output value(s) yields the first password in a form of a long complex character pattern.

9. A computer-implemented method (CIM) comprising:

creating a plurality of digital twins each corresponding to a plurality of processes;

operating the plurality of digital twins in the plurality of processes in a real world;

receiving an operational data set including data indicative of the operating of the plurality of processes in the real world;

updating the plurality of digital twins, based on the operating of the plurality of processes in the real world as indicated in the operational data set, as a plurality of real world counterparts of the plurality of digital twins;

deriving a first password based on the plurality of real world counterparts of the plurality of digital twins; and authenticating a first user based on the first password, wherein the first password is stronger as a number of the plurality of digital twins increases.

10. The CIM of claim 9, wherein the updating the plurality of digital twins includes using the plurality of digital twins in a simulator program so that updated digital twin data results from the using of the simulator program.

11. The CIM of claim 9, wherein at least one of the plurality of processes is a manufacturing process.

12. The CIM of claim 9, wherein at least one of the plurality of processes is a set of medical treatment(s).

13. The CIM of claim 9, wherein the first user controls the operating the plurality of processes.

14. The CIM of claim 9, wherein the updating includes: (i) providing a set of input value(s) to a simulator program, with the set of input value(s) being based on the operational data set, and (ii) running the simulator program to obtain a set of output value(s).

15. The CIM of claim 14, wherein the deriving the first password includes hashing the set of output value(s).

16. The CIM of claim 15, wherein the set of output value(s) are complex and real, and the hashing the set of output value(s) yields the first password in a form of a long complex character pattern.

17. The CIM of claim 9, wherein the creating the plurality of digital twins includes selecting at least one pre-existing digital twin corresponding to the plurality of processes.

* * * * *